(12) United States Patent
Snyder et al.

(10) Patent No.: US 7,615,086 B2
(45) Date of Patent: Nov. 10, 2009

(54) ASSEMBLY FOR ASH SEPARATION FROM FLUE GAS

(75) Inventors: Robert E. Snyder, Uniontown, OH (US); Eric J. Schwartz, North Canton, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 0 days.

(21) Appl. No.: 11/711,509

(22) Filed: Feb. 27, 2007

(65) Prior Publication Data

US 2008/0202077 A1    Aug. 28, 2008

(51) Int. Cl.
*B01D 41/00* (2006.01)
(52) U.S. Cl. .................... 55/300; 55/295; 55/304
(58) Field of Classification Search ........... 55/295, 55/300, 304; 96/282
See application file for complete search history.

(56) References Cited

U.S. PATENT DOCUMENTS

| | | | | |
|---|---|---|---|---|
| 1,479,271 A | * | 1/1924 | Wolcott ................... 95/70 |
| 2,864,459 A | * | 12/1958 | Gustafsson ............... 96/35 |
| 3,030,753 A | * | 4/1962 | Pennington .............. 96/37 |
| 3,200,565 A | * | 8/1965 | Gustafsson ............... 96/35 |
| 3,219,130 A | * | 11/1965 | Steuernagel et al. ........ 96/35 |
| 3,664,092 A | * | 5/1972 | Vincent ................... 96/36 |
| 3,844,742 A | * | 10/1974 | Petersen ................. 96/35 |
| 4,035,165 A | * | 7/1977 | Archer ................... 95/25 |
| 4,263,022 A | * | 4/1981 | Brandt et al. ............ 96/33 |
| 4,356,008 A | * | 10/1982 | Franzen et al. ........... 96/33 |
| 4,502,870 A | * | 3/1985 | Wheeler ................. 95/2 |
| 4,769,049 A | * | 9/1988 | Tong .................... 96/34 |
| 5,079,459 A | * | 1/1992 | Huston et al. ............ 310/15 |

* cited by examiner

Primary Examiner—Jason M Greene
Assistant Examiner—Sonji Turner
(74) Attorney, Agent, or Firm—Michael J. Seymour; Eric Marich

(57) ABSTRACT

A particulate separator includes a plurality of perforated screens which remove ash particulate from flue gas. A rapper assembly dislodges ash deposits on the perforated screens by exerting a vibrating force thereon. Shafts, which are operatively connected to a rapping device, are received in the openings of perforated screens and welded thereto. The rapper exerts a force on the shaft, which, in turn, vibrates the perforated screen. The vibration of the perforated screens causes the ash deposits to fall off into the hopper.

15 Claims, 4 Drawing Sheets

ASSEMBLY FOR ASH SEPARATION FROM FLUE GAS

FIELD AND BACKGROUND OF INVENTION

The present invention relates generally to coal-fired power plants and in particular to an assembly for ash separation from flue gas.

It is well-known that coal and other solid fuels generate significant quantities of ash as a byproduct of combustion. The ash typically collects at the bottom of the furnace, but significant quantities of ash becomes entrained in the flue gas stream exiting the furnace. Hoppers for the collection of ash from the flue gas stream are typically positioned downstream from the furnace in order to accumulate the ash entrained in the flue gas stream.

The carry over of ash particulate into equipment located downstream of the furnace, is a severe problem. The catalytic converter reduces the NOx levels in flue gas. The catalytic converter typically includes packings of narrow channels having catalyzer surfaces. The ash in the flue gas accumulates on the catalyzer surfaces which results in clogging of the catalyzer channels and the channel walls increasingly losing their catalytic effect.

In addition to a reduction of the catalytic effect, the ash accumulation on the catalyzer channel wall results in pressure loss due to the reduction of the flow cross-section. The ash particulate lodges into the surfaces of the downstream equipment and results in plugging of air passages and increased pressure differentials. It often becomes necessary to shut down the furnace and clean, repair or replace the catalytic converter. The replacement of the catalytic converters is extremely expensive, and in particular on the one hand due to the unavoidable shutdown of the power station, and on the other hand due to the procurement and assembly costs of the catalytic converters.

Conventional power plants employ an ash hopper upstream from the catalytic converter to collect ash particulate from the flue gas stream. Screens can be positioned across the flue gas stream at the outlet duct of the ash hopper in order to increase ash removal. The screens can cover the entire duct, or cover only a portion of the duct and be staggered with additional partial screens. The screens are typically positioned vertically across the horizontal section of the outlet duct downstream of the hopper, or can be tipped away from the hopper at their upper edges. In either the vertical arrangement of the screens or where the screens are tipped away from the hopper, the pressure of flue gas stream tends to hold the ash in position on the screen once the ash has impacted the screen surface. The holding of the ash against the screen results in plugging of the screen and decreased flow of the flue gas stream. The plugging of the screens also increases power plant operating cost.

SUMMARY OF INVENTION

It is an object of the present invention to provide a system for improved removal of ash from an ash laden flue gas.

It is another object of the invention to provide a system for ash removal which includes a means for removing ash deposits on the ash removal device.

It is also an object of the invention to provide a system for ash removal which protects the catalytic converter from obstructions in a simple and effective manner.

Accordingly, the invention comprises a particle separator having a chamber with an inlet for receiving flue gas and an outlet for exhausting the flue gas. The chamber houses a plurality of perforated screens. Each screen has at least one opening. A rapper assembly is mounted to a chamber wall. The rapper assembly includes a rapper and a shaft which is operatively connected to the rapper. The shaft extends through an opening in the chamber wall and the openings of the perforated screens. Thus, the shaft directly contacts each of the perforated screens. The rapper moves the shaft, which in turn, vibrates the perforated screens to dislodge the ash particulate therefrom.

DESCRIPTION OF THE PREFERRED EMBODIMENTS

Figure 3:
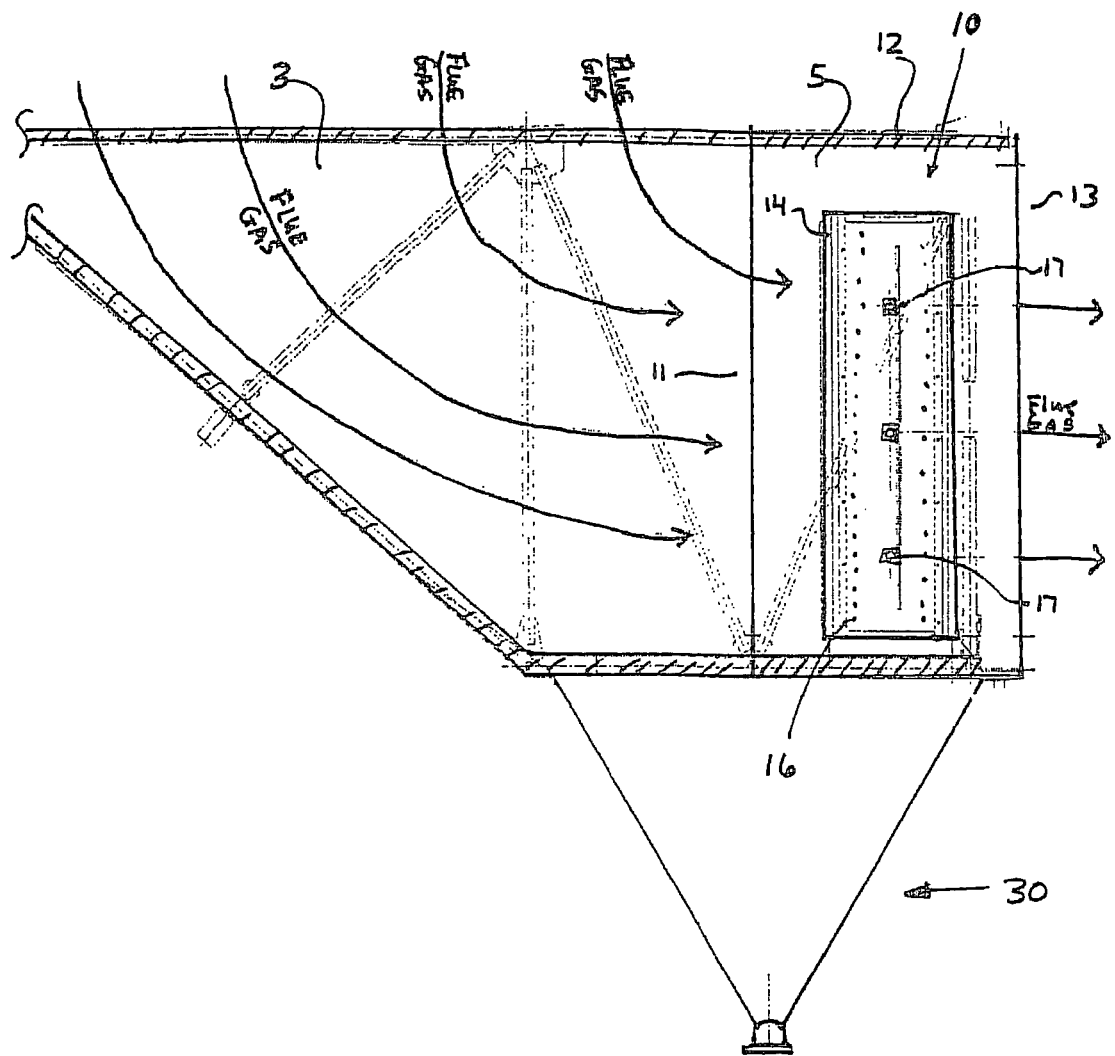
FIG. 3 is a side sectional view of the first embodiment of an ash screen system according to this invention.

As shown in FIG. 3, a boiler (not shown) is connected via a flue gas channel 3 to a particulate separation chamber 5. The flue gas channel 3 transfers the ash laden gas to the particulate separation chamber 5. The particulate separation chamber 5 has a housing or frame 12 which defines an inlet opening 11 and an outlet opening 13.

A particulate separator 10 is housed inside the particulate separation chamber 5. The particulate separator 10 includes screens 14 which are connected to the frame 12 by welds, nut and bolt connection or by other known connectors.

The screens 14 of the particulate separator 10 are positioned across the inlet opening 11 and extend vertically downward from the edge of the inlet opening 11. The screens 14 are preferably dimensioned to extend across both of the inlet 11 and outlet 13 openings. The screens 14 can be arranged in a multitude of formations—horizontally or vertically aligned, parallel or at angle to one another and/or in staggered formation.

The screens 14 have perforations 16 to allow the flow of flue gas through the particulate separation chamber 5. The screens 14 are preferably plates and composed of materials, such as steel, which can withstand the temperature and constant abrasion of ash laden flue gas. By utilizing a perforated screen, instead of a woven wire screen element, the rapping force can be applied directly to the planar surface of the screen 14. The force used can be less, and at lower frequencies, that would typically be required when a frame holding a woven wire screen element is employed.

Ash laden flue gas enters the particulate separation chamber 5 through the inlet opening 11 and strikes the surface of the screens 14. The screens 14 collect ash particulate in the flue gas as the gas passes through the chamber 5. The ash entrained in the flue gas strikes the screens 14 and is deflected downward into an ash hopper 30. However, ash particulate also remains on the screens 14 and accumulates over time. As the ash deposits accumulate, the efficiency of the particular separator 10 decreases.

Figure 1:
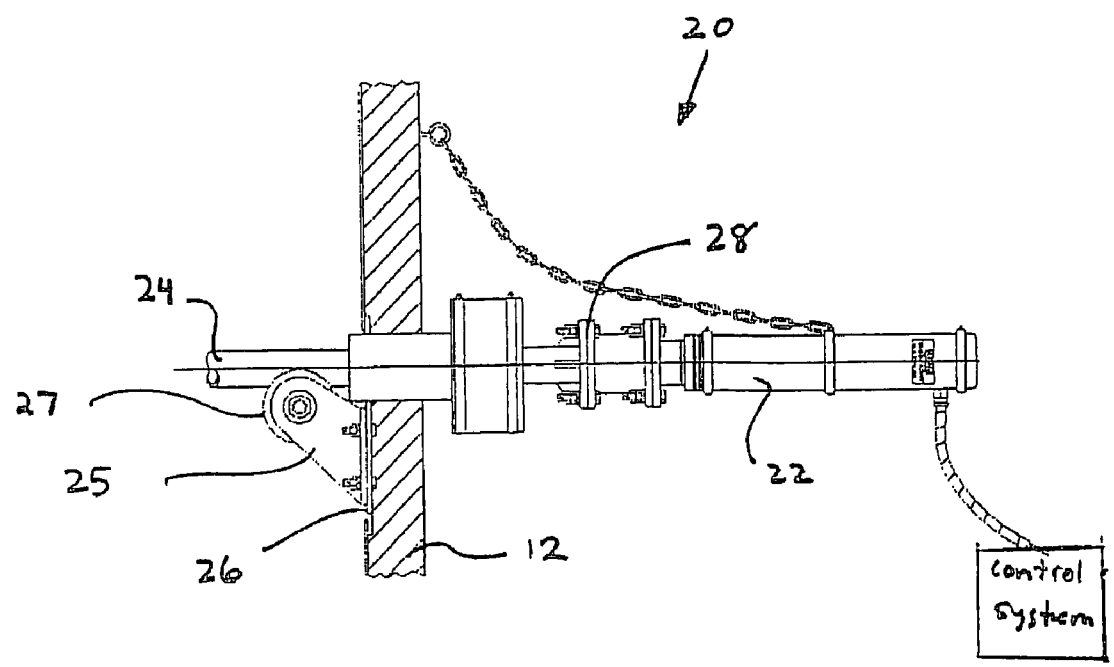
FIG. 1 is a front view of the rapper assembly of a first embodiment of an ash screen system according to this invention.
Figure 4:
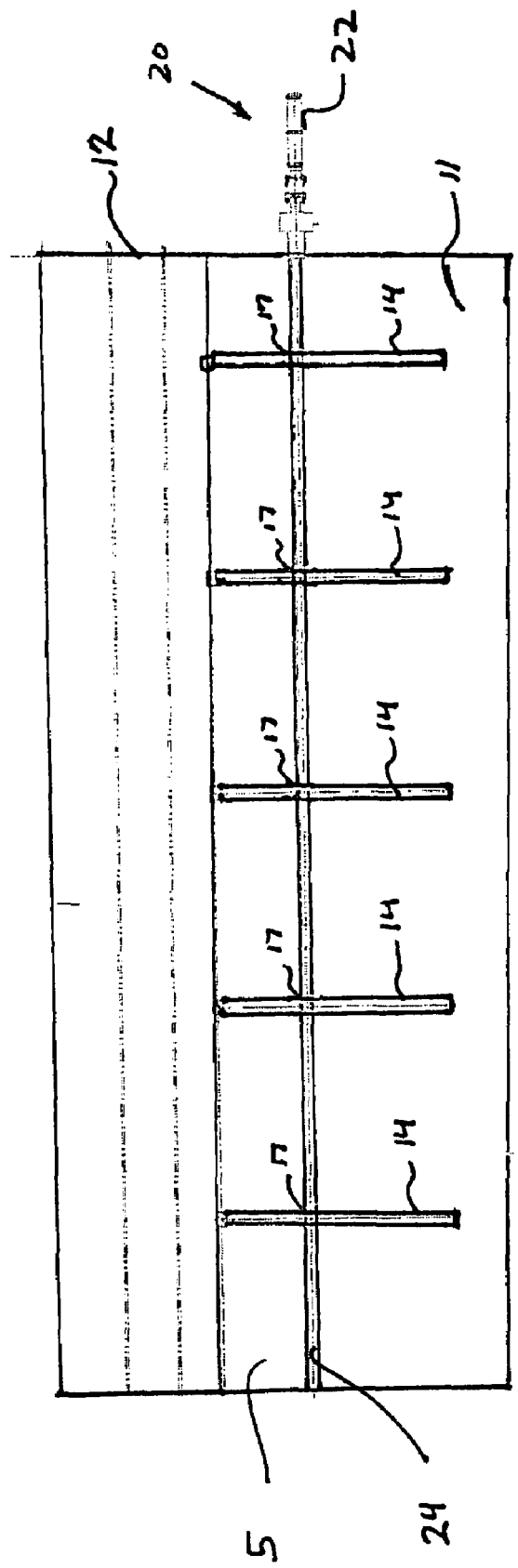
FIG. 4 is a front view of a first embodiment of an ash screen system according to this invention.

In order to clean the ash deposits from the surfaces of the screens 14, rapper assemblies 20, as shown in FIGS. 1 and 4, are mounted to the separation chamber frame 12. As will be understood by one skilled in the art, a greater or lesser number of rapper assemblies 20, at varying locations, could alternatively be employed. The rapping of the screens 14 is by direct contact on the screens 14 themselves, rather than on the frame of the screen. Direct rapping on the screens 14 will provide enhanced cleaning of the collection surface.

Each rapper assembly 20 generally includes a rapper 22, a shaft 24, a shaft mounting plate 26 and a seal support plate 28. The rapper assembly also includes a control system (schematically shown) which controls the operation of the rapper 22. The control system can operate the rappers individually or simultaneously in groups and controls the frequency of impact hits and striking force for each rapper 22.

The rapper is positioned on the frame 12 of the separation chamber 5. The rapper 22 may be a pneumatic or electromechanical hammer of a variety well known in the industry. One such electromechanical hammer is disclosed in U.S. Pat. No. 5,079,459, which is hereby incorporated by reference. The invention may employ a commercially available rapper, such as SR-A1 model, which is available from A.V.C. Associates, Inc.

The shaft 24 is preferably comprised of high temperature mechanical tubing with preferably has a 2.5 inch outer diameter and a 0.25 inch wall. The seal support plate 26 operatively connects the rapper 22 to the shaft 24 in axial alignment. The seal support plate 28 is preferably comprised of stainless steel and has a thickness of 3/8 inches.

The shaft mounting plate 26 is mounted, preferably via a seal weld, to the particulate separator chamber wall. The mounting plate 26 supports the shaft 24 at the point where the shaft 24 extends into the chamber 5. The shaft 24 extends through an opening (not shown) of the mounting plate 26.

The rapper assembly preferably also includes a roller support bracket 25 which is mounted to the chamber frame 12. The roller support bracket 25 includes a roller 27 which supports the horizontal movement of the shaft 24 toward and away from the screen 14.

Figure 6:
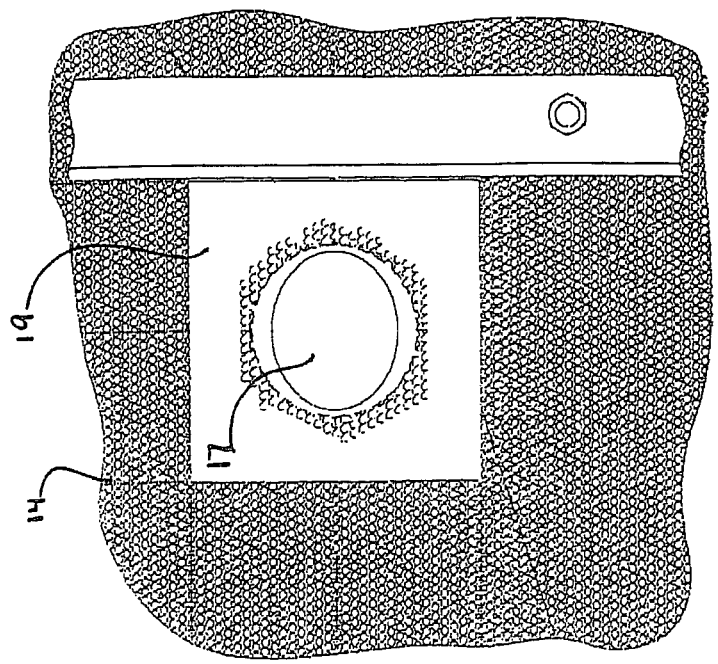
FIG. 6 is a side view of the perforated screen of an ash screen system according to this invention.

The screens 14 include openings 17 which receive the shafts 24. The shafts 24 extend through the openings 17 of the screen 14 across the width of the particulate separation chamber. The shafts 24 are preferably welded to plates 19 (shown in FIG. 6) positioned on both sides of the screens 14 around the openings 17.

The openings 17 in each screen 14 are preferably aligned with the openings 17 of the adjacent screens 14 to facilitate entry and removal of the shafts 24 from screen to screen. The openings 17 are preferably positioned at the center of the screens 14.

Figure 5:
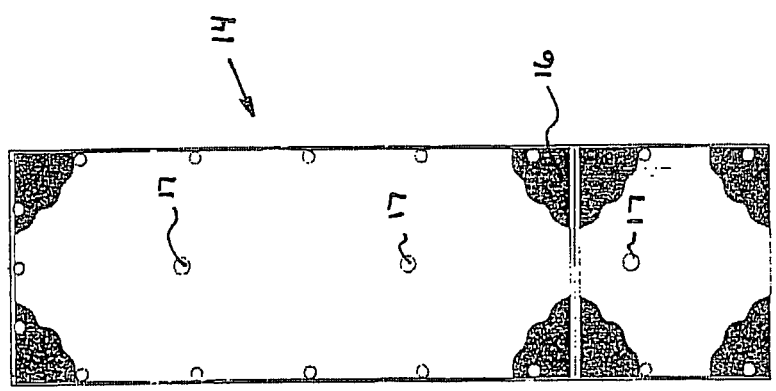
FIG. 5 is a side view of an opening of the perforated screen of an ash screen system according to this invention.

As shown in FIG. 5, the screens 14 have preferably a rectangular shape and are approximately thirteen feet in length and four feet in width. However, the screens 14 can have any dimensions and shape which are suitable for mounting inside the particulate separation chamber 5.

During operation of the rapper assembly 20, the rapper 22 transmits shock energy through the seal support plate 28 to the shaft 24. The axial alignment of the rapper 22 and the shaft 24 increases the efficiency of shock energy to the screens 14.

The shafts 24 vibrate the screens 14 which causes deposited ash particles to fall off from the screens 14 and to pass into the ash funnel 7.

The rapper 22 is preferably a spring assisted electromagnetic device which is oriented in a horizontal plane. The rapper 22 includes a coil (not shown) which is supplied with electrical current for creating a magnetic field. The magnetic field compresses an internal rapper spring thereby storing potential energy. When an electrical signal is suspended, the stored energy of the spring is released and accelerates an internal hammer (not shown). The hammer, in turn, moves the shaft 24 via the seal support plate 28, thereby imparting a shaking force on the screens 14.

The impact energy is regulated by the rapper controller which can be set to control the amount of electrical energy supply in a signal cycle. The controller can also be programmed to vary the frequency of the rapping.

Figure 2:
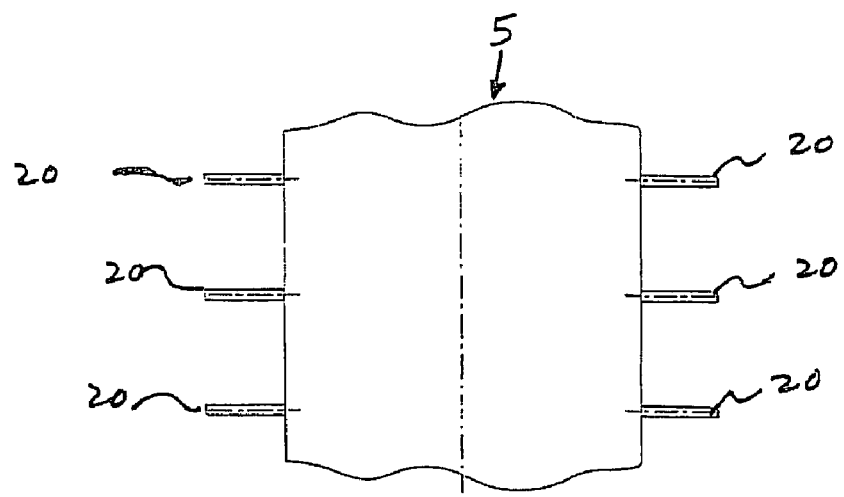
FIG. 2 is a schematic view of a second embodiment of an ash screen system according to this invention.

In another embodiment (which is schematically shown in FIG. 2), the proposed invention employs six separate rappers, three mounted on opposite sides of the air separation chamber 5, to rap the screens 14. Each individual rapper 22 is attached to a shaft which extends through each of the screens 14. Three rappers 22 are provided and the shafts 24 of each rapper are spaced vertically along the height of the same screens 14. The shafts 24 which extend through the same screen are preferably vertically aligned.

In an alternative embodiment, the rapper may be connected via a bracket or series of brackets or other connecting means to the plates without having openings for the shafts that extend through the screen.

The invention capitalizes upon the ability to vary the force, duration, timing, etc. of the various rapping elements employed on such a planar screen element. If ash deposition is more severe on an upper portion of the screen, for example, the rapping can be adjusted to focus on that area. By having individual control over individual rappers, more efficient and targeted cleaning can be accomplished. The invention can rap an upper region, then a middle region, and then a lower region, in that order if desired, or alternative orders can be used. Any possible permutation of order, timing and/or duration and amount of force can be used to achieve cleaning of the screen elements can be employed.

While a specific embodiment of the invention has been shown and described in detail to illustrate the application of the principles of the invention, it will be understood that the invention may be embodied otherwise without departing from such principles.

We claim:

1. A particle separator for removing particulate from a flue gas, said particle separator located upstream of a catalytic convertor and comprising:
   a chamber having an inlet for receiving a flue gas and an outlet for exhausting a flue gas from the chamber after passing there through;
   a plurality of perforated screens disposed within the chamber, wherein each screen has a planar surface; and
   a means for vibrating the screens, wherein the vibrating means directly contacts the planar surface of the screens, comprising at least one rapper having a hammer and a shaft operatively connected to the hammer, the shaft extends through openings formed in a chamber wall and the perforated screens, and wherein the screens have a plate which surrounds the opening of the perforated screen and the shaft is welded to the plate.

2. The particle separator as claimed in claim 1 wherein the rapper further comprises a seal support plate which operatively connects the hammer to the shaft.

3. The particle separator as claimed in claim 1 wherein the rapper further comprises a controller which controls the operation of the rapper.

4. The particle separator as claimed in claim 1 wherein the perforated screens extend across the entire inlet opening of the chamber and the shaft extends through each of the perforated screens.

5. The particle separator as claimed in claim 1 wherein a plurality of rappers are mounted on opposite sides of the chamber, the shafts of the rappers positioned on the same side of the chamber are spaced vertically along the height of the same perforated screens.

6. The particle separator as claimed in claim 5 wherein the perforated screens are horizontally aligned.

7. The particle separator as claimed in claim 5 wherein the shafts are vertically aligned.

8. The particle separator as claimed in claim 1 wherein the perforated screens are metal plates with perforations.

9. The particle separator as claimed in claim 1 wherein the perforated screens are mounted in a staggered formation.

10. The particle separator as claimed in claim 1 further comprising a roller support bracket mounted to a chamber wall, the roller support bracket having a roller which movably supports the shaft.

11. A particle separator for removing particulate from a flue gas, said particle separator located upstream of a catalytic convertor and comprising:
  a chamber having an inlet for receiving a flue gas and an outlet for exhausting the flue gas from the chamber after passing there through;
  a plurality of perforated screens disposed within the chamber, each screen having at least one opening;
  a rapper assembly mounted on a chamber wall, the rapper assembly having a rapper and a shaft operatively connected to the rapper, the shaft extends through the at least one opening of the perforated screens.

12. The particle separator as claimed in claim 11 wherein a plurality of rapper assemblies are mounted to the chamber wall, the shafts of each of the rapper assemblies are aligned with each other and extend through the openings of the perforated screens.

13. The particle separator as claimed in claim 12 wherein the rapper assemblies are mounted to opposite walls of the chamber.

14. The particle separator as claimed in claim 11 wherein at least one opening of the perforated screen is vertically aligned with the at least one opening of an adjacent perforated screen.

15. A particle separator for removing particulate from a flue gas, said particle separator located upstream of a catalytic convertor and consisting essentially of:
  a housing;
  a plurality of perforated screens affixed to the housing, each perforated screen having at least one opening which is vertically aligned with the opening of the adjacent screen, wherein the perforated screens are disposed in the housing in horizontal alignment; and
  a rapper assembly mounted on an outer wall of the housing, the rapper assembly having a rapper and a shaft operatively connected to the rapper, the shaft extends through the at least one opening of the perforated screens.

* * * * *